(12) United States Patent
Purohit et al.

(10) Patent No.: US 9,959,579 B2
(45) Date of Patent: May 1, 2018

(54) DERIVATION AND PRESENTATION OF EXPERTISE SUMMARIES AND INTERESTS FOR USERS

(71) Applicant: Microsoft Corporation, Redmond, WA (US)

(72) Inventors: Hemant Purohit, Fairborn, OH (US); Paul Alexander Dow, San Francisco, CA (US); Lei Duan, San Jose, CA (US); Omar Alonso, Redwood Shores, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 13/797,914

(22) Filed: Mar. 12, 2013

(65) Prior Publication Data

US 2014/0279798 A1 Sep. 18, 2014

(51) Int. Cl.
*G06F 17/00* (2006.01)
*G06Q 50/00* (2012.01)
*G06Q 10/10* (2012.01)

(52) U.S. Cl.
CPC .......... *G06Q 50/01* (2013.01); *G06Q 10/101* (2013.01)

(58) Field of Classification Search
CPC ....... G06Q 30/0224; G06Q 30/0255–30/0256; G06Q 50/01
USPC .............................................. 706/12, 15, 45
See application file for complete search history.

(56) References Cited

U.S. PATENT DOCUMENTS

| | | | |
|---|---|---|---|
| 8,255,380 B2* | 8/2012 | Christensen et al. | 707/706 |
| 8,326,831 B1 | 12/2012 | Aguera y Arcas et al. | |
| 9,235,865 B1* | 1/2016 | Zang | H04W 4/08 |
| 2006/0112146 A1* | 5/2006 | Song | G06Q 10/10 |
| 2007/0168345 A1* | 7/2007 | Gibbs | G06F 17/30684 |
| 2007/0233656 A1* | 10/2007 | Bunescu | G06F 17/278 |
| 2009/0198667 A1* | 8/2009 | Groeneveld | G06F 17/30719 |
| 2010/0070554 A1* | 3/2010 | Richardson et al. | 709/202 |
| 2011/0125697 A1 | 5/2011 | Erhart et al. | |
| 2011/0153423 A1* | 6/2011 | Elvekrog et al. | 705/14.53 |
| 2011/0153686 A1 | 6/2011 | Campbell et al. | |

(Continued)

FOREIGN PATENT DOCUMENTS

| | | | |
|---|---|---|---|
| EP | 2482202 A1 | 8/2012 | |
| KR | 101248193 B1 * | 3/2013 | |
| WO | WO 2012178152 A1 * | 12/2012 | G06F 17/30722 |

OTHER PUBLICATIONS

It's not in their tweets: Modeling topical expertise of Twitter users, by Wagner, published 2012.*

(Continued)

*Primary Examiner* — David R Vincent

(57) ABSTRACT

Architecture that automatically generate concise descriptions of users in social media. The descriptions communicate classification or category of a given social media user in a small amount of viewing space. The description can be based on available metadata (e.g., user profile biography) and/or other information about that person, as may be obtained from the information data sources (e.g., structured knowledge bases) on networks such as the Internet and enterprises, for example. The descriptions can also be query-dependent, by assuming there is some relationship between the social media user and a query, in which case, the descriptions illustrate that relationship.

20 Claims, 9 Drawing Sheets

(56) References Cited

U.S. PATENT DOCUMENTS

| | | | |
|---|---|---|---|
| 2011/0184886 | A1 | 7/2011 | Shoham |
| 2011/0313963 | A1* | 12/2011 | Liu .................. G06Q 10/06 706/48 |
| 2012/0084247 | A1 | 4/2012 | Aguera y Arcas et al. |
| 2012/0197995 | A1 | 8/2012 | Caruso |
| 2012/0254095 | A1* | 10/2012 | Flinn et al. .............. 706/52 |
| 2013/0096991 | A1* | 4/2013 | Gardner et al. ........ 705/7.42 |
| 2014/0324624 | A1* | 10/2014 | Ward ................ H04W 4/021 705/26.7 |

OTHER PUBLICATIONS

Understanding Experts' and Novices' Expertise Judgement of Twitter Users, by Liao, published 2012.*

Measuring Influence in Social Networks using a network Amplification score—an analysis using Cloud Computing, by Hussain, published 2012.*

Chua, et al. "Automatic Summarization of Events from Social Media", retrieved at: <<http://www.hpl.hp.com/research/scl/papers/socialmedia/tweet_summary.pdf>>, last accessed: Jan. 17, 2013, 11 pages.

Brad Shorr, "The Essential Guide to Meta Descriptions that Will Get You Found Online", retrieved at: <<http://contentmarketinginstitute.com/2012/02/essential-guide-to-meta-descriptions/>>, Feb. 2, 2012, 6 pages.

Russell et al., "A Comparison of Generated Wikipedia Profiles Using Social Labeling and Automatic Keyword Extraction", Proceedings of the Fourth International Association for the Advancement of Artificial Intelligence Conference on Weblogs and Social Media, May 23, 2010, pp. 319-322.

Abel et al, "Analyzing User Modeling on Twitter for Personalized News Recommendations", Proceedings of the 19th International Conference on User Modeling, Adaption, and Personalization, Jul. 11, 2011, 12 pages.

Abel et al., "Semantic Enrichment of Twitter Posts for User Profile Construction on the Social Web", Proceedings of the 8th Extended Semantic Web Conference on the Semanic Web: Research and Applications, May 2011, 15 pages, vol. Part II.

Yarosh et al., "Asking the Right Person: Supporting Expertise Selection in the Enterprise", Proceedings of the SIGCHI Conference on Human Factors in Computing Systems, May 5, 2012, 10 pages.

Reichling, et al., "Expert Recommender Systems in Practice: Evaluating Semi-Automatic Profile Generation", Proceedings of the SIGCHI Conference on Human Factors in Computing Systems, Apr. 6, 2009, 10 pages.3.

Chen et al., "Short and Tweet: Experiments on Recommending Content from Information Streams", Proceedings of the SIGCHI Conference on Human Factors in Computing Systems, Apr. 10, 2010, 10 pages.

Hahn et al., "The Challenges of Automatic Summarization", Computer, Nov. 2000, pp. 29-36, vol. 33, Issue 11.

Madnani et al., "Multiple Alternative Sentence Compressions for Automatic Text Summarization", Proceedings of the Document Understanding Conference, Apr. 26, 2007, 8 pages.

Sharifi, et al., "Summarizing Microblogs Automatically", Human Language Technologies: The Annual Conference of the North American Chapter of the Association for Computational Linguistics, Jun. 2010, pp. 685-688.

Kincaid et al., "Derivation of New Readability Formulas (Automated Readability Index, Fog Count, and Flesch Reading Ease formula) for Navy Enlisted Personnel", Research Branch Report 8-75, Feb. 1975, 51 pages.

Salton et al., "Term-Weighting Approaches in Automatic Text Retrieval", Journal of Information Processing and Management, 1988, pp. 513-523, vol. 24, No. 5.

Joseph L. Fleiss, "Measuring Nominal Scale Agreement Among Many Raters", Journal of Psychological Bulletin, Nov. 1971, pp. 378-382, vol. 76, No. 5.

I.-C. Hsu, "Semantic Tag-Based Profile Framework for Social Tagging Systems," Computer Journal, Sep. 2012, pp. 1118-1129, vol. 55, No. 9.

M. De Gemmis, et al., "Integrating Tags in a Semantic Content-Based Recommender," Proceedings of the 2008 ACM Conference on Recommender Systems, Oct. 23, 2008, pp. 163-170.

Zhou et al., "Finding Someone in My Social Directory Whom I Do not Fully Remember or Barely Know," Proceedings of the 2012 ACM International Conference on Intelligent User Interfaces, Feb. 14, 2012, pp. 203-206.

Miller et al., "Work, Jobs, and Occupations: A Critical Review of the Dictionary of Occupational Titles", The National Academies Press, 1980, 461 pages.

* cited by examiner

*← 500*

| USER CLASS | INTUITION |
|---|---|
| X is a Casual User | If X seldom comes to social network to message, may be a lurker or listener. |
| X is a Conversationalist | If X simply messages too much, but little or no response or attention from others. |
| X is an Authoritative Writer | If X messages are resent/forwarded often, but seldom sends (possibly writes good content). |
| X is an Information Hub on Social Network | If X's messages are resent/propagated a lot and actively participates by messaging more. |
| X is a Casual Celebrity | If X is popular and often associated with some topics (by mentions), but rarely messages. |
| X is a Disengaged Celebrity | If X is popular (mentioned a lot) and also messages, but does not get resent/forwarded a lot. |
| X is a Passive Celebrity | If X is popular (mentioned a lot) and is resent/forwarded a lot, but rarely messages. |
| X is an Active Celebrity | If X is popular and gets resent/forwarded a lot as well as writes messages actively. |

*FIG. 5*

200# DERIVATION AND PRESENTATION OF EXPERTISE SUMMARIES AND INTERESTS FOR USERS

BACKGROUND

Web applications are increasingly showing recommended users from social media along with some descriptions, as an attempt to show relevancy. Existing techniques show a user profile biography as a summary for an expert, for example. Previous work on user summarization or social profiling of users has focused on topical personalization. This includes topic models on user content and qualitative models on user profile data, both of which are used for segmenting users on various attributes (e.g., engagement, personality, etc.) and categorizing users into various classes.

Existing analogous work to user summarization is document summarization. Document summarization has been studied for longer textual documents. In both cases, however, there is an information gap, since the research community has mainly focused on structured and formal language content to understand context.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture solves the problem of automatically generating short, clear, and concise descriptions (summaries) of users in social media and other user environments. The descriptions communicate classification or category of a given user (e.g., social media) in a small and constrained amount of viewing space. The description can be based on available metadata (e.g., user profile biography) and/or other information about that user, as may be obtained from information data sources (e.g., structured knowledge bases) on networks, such as the Internet and enterprises, for example.

The summaries (descriptions) can also be query-dependent, by assuming there is some relationship between the social media user and a query, in which case, the summaries illustrate that relationship. Although described in the context of social media users, the disclosed architecture applies equally to non-social media users.

More specifically, the disclosed architecture enables the automatic generation of short summaries (e.g., seventy characters or less) of social media users thereby further enabling applications where people (viewers) can, at a glance, identify the user and determine why the user may be of interest. User-generated (self-generated) biographies are summarized by identifying segments related to known professions, occupations, and titles. Conflation can be performed between social media users and documents about the users as can be obtained from networks such as the Internet, and from structured knowledge bases. The conflation can be accomplished by identifying "link triangles" (node cross-checking) between different web documents of the same or different data sources.

Additionally, given a structured document from a structured knowledge base and/or entity graph that is conflated with a social media user account, occupation metadata can be utilized to generate the short summary. Given a document known to describe a given person, as can be obtained from network resources (e.g., websites) that is conflated with a social media user account, the short summary of the user can be extracted from the first few sentences.

Users (e.g., social media) can be classified (categorized) based on dimensions (e.g., three), and the short summary can be written for each of the resulting classes. The summaries related to a class can then be applied to a user that falls within the class.

To identify the optimum summary for a social media user, given multiple candidate summaries, a scoring function can be employed that quantifies readability, specificity, and interestingness of each summary. The scoring function can be based on the frequency of each word in the summary in a global corpus (e.g., web). The score can be normalized by length to ensure that longer summaries are not always desired.

To identify the optimum summary (e.g., expertise summary) for a social media user, given multiple candidate summaries, an N-gram language model can be created from the global corpus (e.g., web) and/or a local corpus (e.g., a set of good summaries) to identify which summary(ies) are more likely to be a well-formed sentence.

Crowd-sourced lists of social media users can also be utilized to extract common topics and categories for users, which can then be used for generating summaries of those users.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates a table of expertise summaries for each class of user.

DETAILED DESCRIPTION

Figure 1:
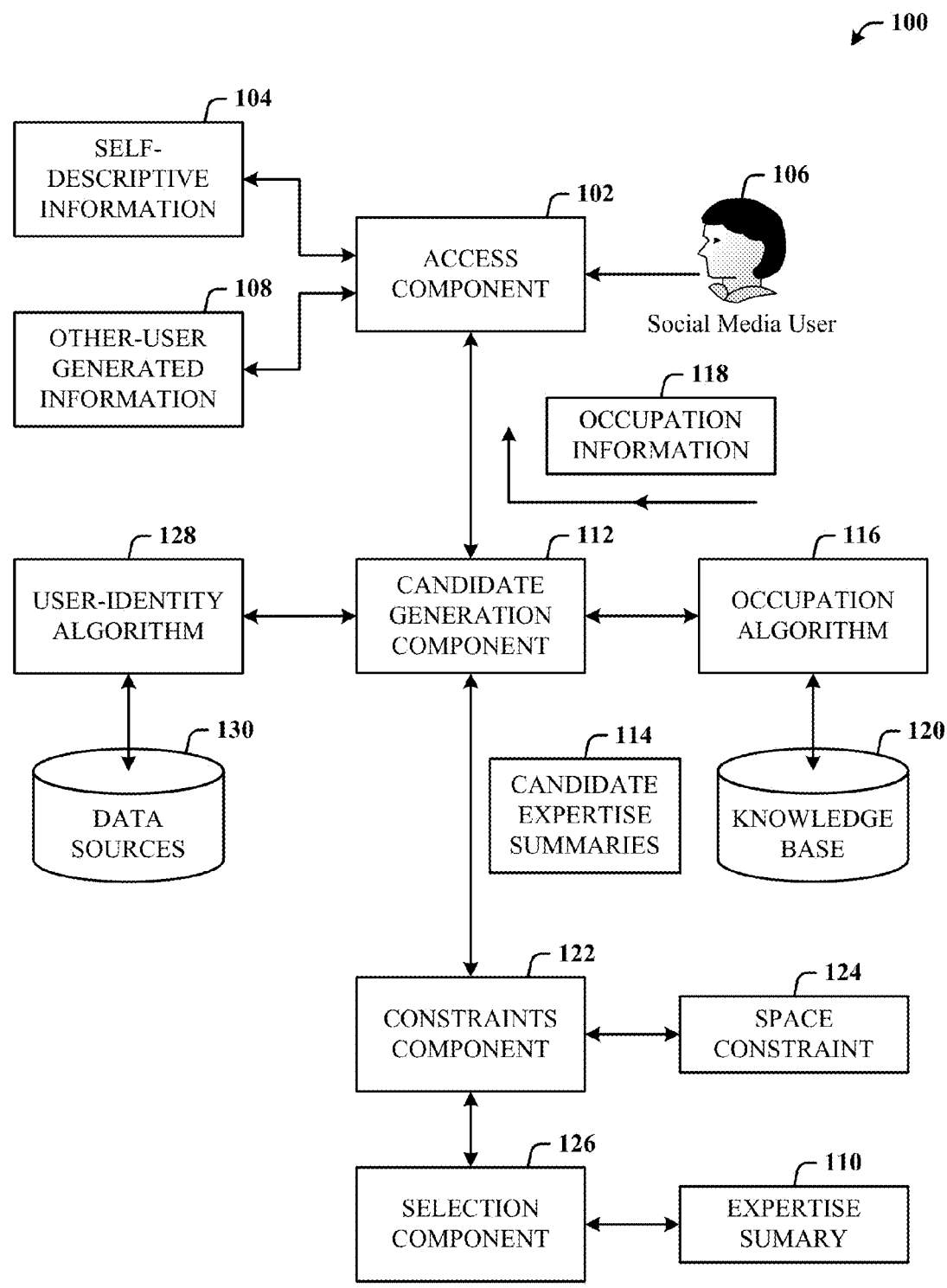
FIG. 1 illustrates a system in accordance with the disclosed architecture.

Recent growth in social media analytics has drawn interest from application designers to show user classifications such as "experts" and user recommendations with respect to target context. Existing algorithms for extracting summaries can also use natural language processing (NLP) techniques.

The disclosed architecture enables the automatic generation of short summaries (e.g., no more than 70 characters) of social media users and other types of users, thereby further enabling applications where people can, at a glance, identify the user and determine why the user may be of interest. User-generated biographies are summarized by identifying segments related to known professions, occupations, and titles, to name a few. Conflation (merging) can be performed between social media users and documents about the users as can be obtained from networks such as the Internet, and from structured knowledge bases, as examples of some of the data sources. The conflation can be accomplished by identifying "link triangles" between different web documents and data sources such that user identities are validated (resolved).

Additionally, given a structured document from a structured knowledge base and/or entity graph that is conflated with a social media user account, occupation metadata can be utilized to generate the short summary. Given a document known to describe a given user, as can be obtained from network resources (e.g., websites) that is conflated with a social media user account, the short summary of the user can be extracted from the first few sentences.

Users (e.g., social media) can be classified (categorized) based on dimensions (e.g., three), and the short description can be written for each of the resulting classes. The descriptions related to a class can then be applied to a user that falls within the given class.

To identify the optimum description for a social media user, given multiple candidates, a scoring function is employed that quantifies the specificity and interestingness of each description. The scoring function can be based on the frequency in a global corpus (e.g., web) of each word in the description. The score can be normalized by length to ensure that longer descriptions are not always desired.

To identify the optimum summary for a social media user, given multiple candidate summaries, an N-gram language model can be created from a global (e.g., web) and/or local (e.g., a set of good descriptions) corpus to identify which candidate summary is more likely to be a well-formed sentence.

Crowd-sourced lists of social media users can also be utilized to extract common topics and categories for users, which can be used for generating summaries of those users. Crowd-sourcing obtains services, ideas, and/or content by soliciting or capturing data from a collection of people, and particularly people from an online community, rather than from traditional employees or suppliers, although the employees and/or suppliers can be part of the collection. This process can occur both online and offline. Crowd-sourcing is different from ordinary outsourcing, in that crowd-sourcing is an online, distributed problem-solving and production model.

The disclosed architecture can also extract information for user classification and summarization from content such as "badges". A badge is content that describes or is an expression of a person's affinities and interests. In other words, a badge is word or phrase that describes a relatively durable fact or characterization of a user, for example, "cyclist", "has been to Norway", "a food junkie", which are likely to be true for a long time or permanently.

To generate a description that is sufficiently short, that can be read "at a glance", and will fit in a search engine results page sidebar, for example, a size (space) constraint on the number of characters (e.g., no more than seventy) in the expertise summary can be imposed. Furthermore, it is a description or title of the given social media user—not a complete sentence. The displayed summary can include the user name followed by a dash (-), and then the description (e.g., Joe Biden—Vice President of the United States).

A list of known occupation patterns is compiled, for example, "Founder of", "Actor in", etc. Given a user-generated biography (e.g., social media site profile biography), segments are identified that match the patterns. Heuristic rules are used to prune and clean-up the resulting summary.

Beginning with a homepage listed in social media user profile, a document (e.g., Wikipedia article) can be identified that matches the social media user name. If the document links to the same homepage, then this is sufficient evidence to associate the document with the social media user account.

A description (summary) template can be constructed for any type of structured metadata that is relevant to a user description. For example, Wikipedia "info boxes" can include a field called "Occupation"; the content of this field can be directly used as a description. For another example, given an entity graph that associates actors with movies they acted in, a template can be constructed of the form X starred in M1, M2, and M3.

If the first sentence fits a known pattern, for example, X is a Y, then the appropriate description Y can be extracted.

In one implementation, three dimensions are employed for social media user classification: user popularity, user activity, and diffusion strength. The formal description of these metrics may vary by social network/service. The user activity metric computes the activity of the users. For a social network such as Twitter™, for example, the user activity is how many tweets (messages) a user writes, with what rate, etc. In one implementation, user activity can be computed only as the number of tweets a user makes in a given time frame.

With respect to the diffusion strength of content of the user, this metric is to compute how well a user's messages (e.g., tweets) have the potential to penetrate in the network (e.g., the number of times a user message is resent/forwarded ("re-tweeted"), the number of times a user was replied to, etc.). In one implementation, diffusion strength can be computed only as the number of times a user message is re-tweeted.

With respect to popularity of the user, this metric is to compute how well a user is known in the social network and has the authority on some topics the user is often associated with (e.g., the number of times a user was mentioned, what was the rate of mentioning over days, etc.). In one implementation, popularity can be computed only as the number of times a user was mentioned.

The social media service such as Twitter™, can be quantified as mention frequency, "tweet" or message frequency, and "re-tweet" or resend/forward frequency, respectively. Each metric can be divided into quantiles, and a user class defined as a specific quantile along each axis. For simplicity, each metric can be divided into only two quantiles: high and low, thus giving eight user classes.

An existing global N-gram language model can be used, or a model constructed from a large number of decidedly-good social media user descriptions. This model provides the probability that any particular bigram or trigram in the description appears in the underlying corpus. Using these probabilities, the probability of each candidate summary can be computed, and the candidate summary with the highest probability is then selected.

Crowd-sourced lists of social media users (e.g., Twitter lists), include a title and, possibly, a description. By extracting common terms from the text associated with these lists, summaries of social media users can be generated by listing the common terms for which they are associated.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include an access component 102 that accesses self-descriptive (also called self-generated) information 104 of a social media user 106 and other-user generated information 108 about the social media user 106 as part of developing an expertise summary 110 of the social media user 106. A candidate generation component 112 generates candidate expertise summaries 114 based on an occupation algorithm 116 that extracts occupation information 118 of the social media user 106 from a knowledge base 120.

A constraints component 122 applies a space constraint 124 to the candidate expertise summaries 114 based on a presentation space limitation. A selection component 126 selects the expertise summary 110 from the candidate expertise summaries 114. The expertise summary 110 is then presented according to the space constraint 124 for viewing by a user.

The occupation algorithm 116 generates a collection of occupation titles from the knowledge base and extracts occupational patterns from the self-descriptive information by joining N-grams. The selection component 126 selects the expertise summary 110 from the candidate expertise summaries 114 based on criteria that include readability, specificity, and interestingness. The expertise summary 110 is generated from user-generated biographies. The expertise summary 110 includes data related to a known profession, an occupation, and a title. In one specific implementation, the occupation algorithm 116 generates the collection of titles from Wikipedia and the U.S. Department of Labor database of occupation information, and extracts the occupational patterns from a user's biography by joining the N-grams.

The candidate generation component 112 can further employ a user identity algorithm 128 that resolves user identity of the social media user 106 using multiple data sources 130. The candidate generation component 112 can further employ a user identity algorithm 128 that resolves user identity of the social media user 106 using multiple data sources 130. The user identity algorithm 128 utilizes the other-user generated information 108 about the social media user 106, as can be obtained from a knowledge base, for example, and resolves conflicts in the user identity in the knowledge base based on out-links to a webpage of the social media user 106. The selection component 126 selects the expertise summary 110 based on results of at least one of the occupation algorithm 116 or the user identity algorithm 128.

Figure 2:
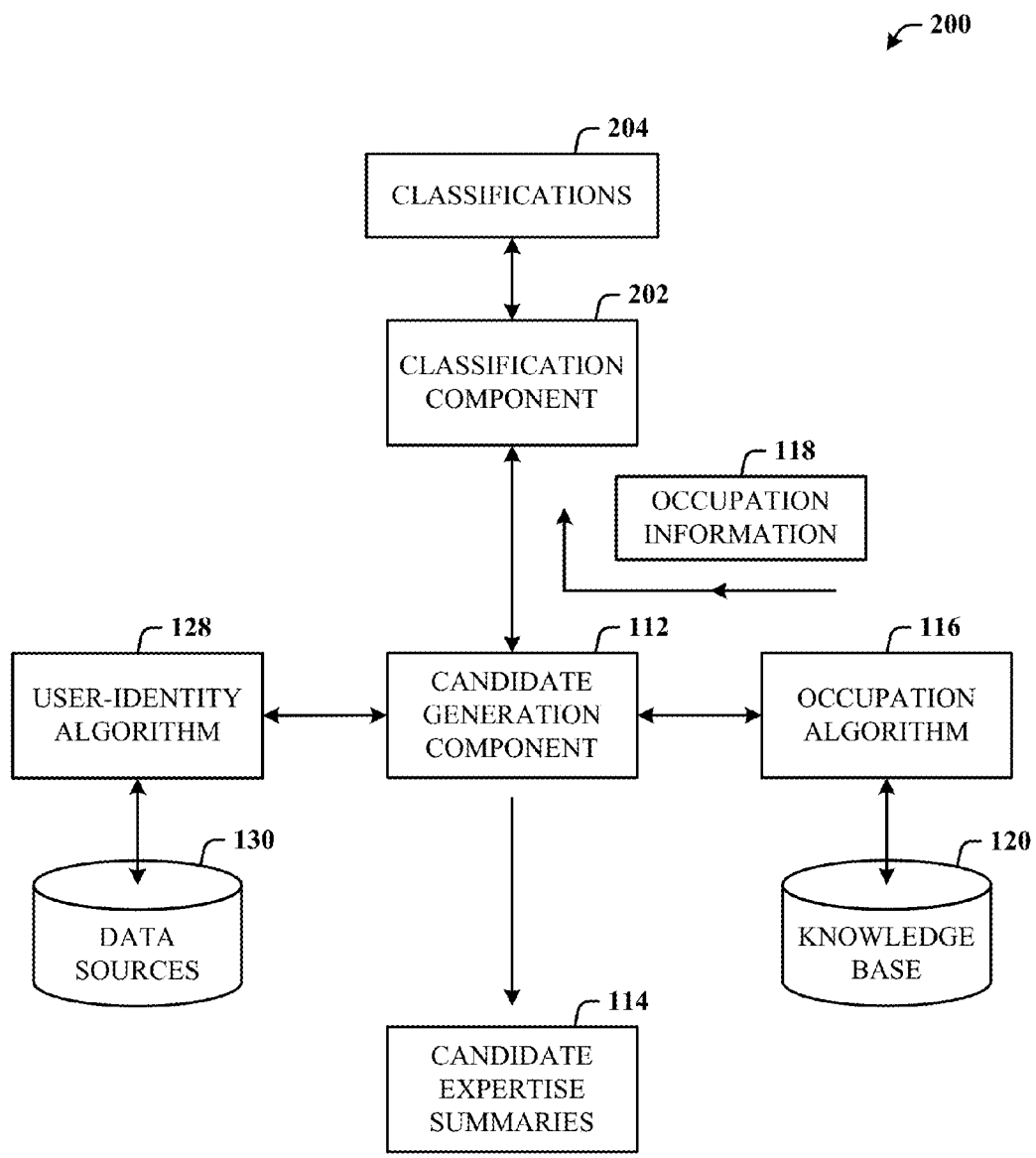
FIG. 2 illustrates an alternative system that further employs classification as part of candidate expertise summary generation.

FIG. 2 illustrates an alternative system 200 that further employs classification as part of candidate expertise summary generation. The system 200 includes the entities and components of system 100 of FIG. 1. The candidate generation component 112 can employ a classification component 202 based on results of the user identity algorithm 128 and/or the occupation algorithm 116. That is, if the results from the user identity algorithm 128 and/or the occupation algorithm 116 are deemed inadequate (incomplete or fail completeness) for the expertise summary 110, the classification component 202 is employed to classify the social media user 106 according to one of multiple classifications of expertise for use in the expertise summary. Inadequacy (incompleteness) can be deemed if either or both of the algorithm results are missing, unobtainable, or the like.

The following description applies the disclosed architecture to the commonly known social media—Twitter. Thus, terms of common parlance with Twitter may be employed. However, it is to be understood that the disclosed architecture applies equally well to other social networks and social media, and is not to be construed as limited to Twitter.

More specifically, the disclosed architecture exploits self-descriptive data (created by the user for which the expertise summary is being created) and can be found in profile descriptions, for example, as well as "informer" data (data created by others that describe the target user, e.g., online structured knowledge bases).

Traditional statistical summarization techniques have difficulty with the informal text of social media; therefore, the disclosed architecture makes use of knowledge bases and shallow natural language processing (NLP). For example, knowledge bases such as the U.S. Department of Labor Statistics reports and occupation titles collection for occupation information, as well as the Wikipedia™ knowledge base for people pages, can be utilized. These are just a few example knowledge bases and data sources that can be accessed for information to be used in the expertise summary, generating the candidate expertise summaries, and/or cross-checking user identities.

In this particular implementation, two candidate summary generation methods are employed. Additionally, a default classification method can be employed for instances where there may be missing and/or noisy data nature (deemed incomplete).

An occupation-pattern based approach (algorithm) first generates a collection of titles from one or more knowledge bases (e.g., an occupation knowledge base), followed by meaningful N-gram extraction (extraction of patterns of occupation data), which contains the title. This is a faster and simpler method than completely depending on computationally expensive statistical learning of the language model.

A link-triangulation based approach (algorithm) exploits informer data from a knowledge base (e.g., Wikipedia people pages), where this triangulation can be based on at least three nodes: a user social network profile page (e.g., Twitter page), a user's Wikipedia page, and a user's personal webpage. This approach resolves user identity in the knowledge base by checking out-links (links directed outward) to the user's personal webpage from the other two nodes. After identity-resolution is completed, structured metadata and content in the knowledge base can be utilized.

To overcome missing user profile information (e.g., biography or personal webpage link), the default user-classification based approach (algorithm) creates user classes based on metrics of popularity, activity, and content diffusion strength of a user in the network.

Note that some users may have multiple expertise summary candidates; hence, techniques can be employed for candidate summary selection based on three quality assessment principles: readability, interestingness, and specificity.

A traditional linguistic approach can be used for the readability measure, while interestingness and specificity can be computationally modeled using a modified TF-IDF (term frequency-inverse document frequency) algorithm, which is a statistical measure that evaluates the importance of a word to a document in a corpus or document collection.

Accordingly, the disclosed architecture enables a systematic approach to automatically generate an expertise summary of a user in space constraints of UI design, using knowledge-enhanced techniques for simpler and faster computation, rather than sophisticated statistical language models.

The problem of expertise summarization and presentation for social media users in space limitations can be formulated as a problem of generating informative textual summarization about a user in a short description.

Problem Statement: Given a set of N experts E={$e_i$|i=1, 2, ..., N} in a social media community C of K (K>N) users, generate a short summary $d_i$ with maximum T characters for each of the expert $e_i$ in the set E.

Continuing with the disclosed architecture applied to the micro-blogging service, Twitter, and considering only English text users (although the disclosed architecture here can be extended for multi-lingual cases), a solution for automatic expertise presentation can be accomplished by first generating candidate short summaries for an expertise (e.g., expert) with length T characters, and then selecting a suitable candidate for final summarization.

With respect to data collection, as previously indicated, self-descriptive data (written by users themselves, e.g., user tweets (messages sent using Twitter), as well as user profile metadata) is employed, as well as other-user generated data. A streaming API (application program interface) can be utilized that provides a random sampling of the ongoing message stream of the users, where each data point contains rich metadata about the message, as well as the author. The messages and user metadata from the stream can be stored in a time slice. User metadata can include interests, location, number of messages written, number of friends/followers, etc.

An API service can be utilized to detect the various expertise classes from the data. For example, sampling the expertise class of "expert" out of the user data set can be performed using the API service; however, any other type of method can be employed to make this determination.

Continuing with the "expert" example, expert scores are fetched for all users, and then the users are ranked. This is followed by extracting the top k users for expertise summarization (e.g., k=30). The other-user generated data is information written by others for an expert. Therefore, knowledge bases such as Wikipedia can be crawled, and a data dump can be performed via the API service. Occupation related lexicon can also be collected using an occupational knowledge base, as described in greater detail hereinbelow for occupation-pattern based summary generation.

Continuing with the expert example for candidate expertise summary generation, the summary generation task for expert class users is problematic in that many experts had a full biography. Moreover, users write uninformative and funny biographies, which are not appropriate for expertise presentation. The problem is further challenged when users write a long biography which exceeds the T characters threshold for summary length, as imposed in one implementation, by user interface (UI) design. Thus, all these factors make it difficult to directly import a full user biography.

As described in greater detail, the overall technique of occupation extraction and link-triangulation, followed by the optional classification method, solve the problem imposed by directly using the full user biography.

With respect to occupation-pattern based extraction, the user biography will oftentimes include occupation titles, such as "author of . . . ", "editor-in-chief of . . . ", etc. Users write such self-descriptive occupation titles in a context that can be used to extract an informative summary about the user. The following actions can be implemented to exploit such patterns:

1. Create an occupation related lexicon by collecting occupation titles using trusted knowledge-bases (e.g., U.S. Department of Labor Statistics reports and occupation titles collection and Wikipedia's occupation categories). This lexicon can be further augmented by other users who will have knowledge of the occupation types which are common lingo (e.g., currently) of social media due to evolving informal English usages (e.g., found in urban dictionaries, etc.), such as "footballer from Manchester United", "blogger at <website>", etc.
2. Filter the user biography data set by detecting occupation titles present in the user biography, using the lexicon in step 1.
3. Pre-process the filtered user biography data set by removing "noisy" characters and words, such as multiple dots, new line characters, emails, contact information indicators such as "contact us", "email us", "booking info", etc., and also by replacing URLs (uniform resource locators) with proxy characters.
4. Perform N-gram set creation from the user biography using linguistic indicators of pause, to tokenize the user biography (e.g., punctuations and conjunction characters {, ; . / and &}).
5. Extract a meaningful N-gram set by selecting all the N-grams containing occupation patterns.
6. Create a candidate summary by joining the members of the extracted N-gram set in step 5.; create potential expertise summaries for final candidacy, if the character length of the summary does not exceed character threshold T, imposed by the UI design of the application.

When joining the resultant N-grams for a summary, the order of the N-gram's position in the full biography is noted, since the user's intelligence or reasoning as to what is more desirable for self-description can be given greater interest. For example, consider the following user biography:

"Tech journalist for All Things D. Oregonian transplanted to New York. Former Business Week writer and columnist. Columbia grad."

The N-gram set of interest is then: {columnist, Tech journalist for All Things D, Former BusinessWeek writer}. With respect to a candidate expertise summary (also referred to as a "tagline"), beginning with first potential candidate summary as "Tech journalist for All Things D, Former BusinessWeek writer, columnist", it is noted that the summary exceeds a T=70 character threshold; therefore, the first potential candidate summary for this user can be processed into two candidate summaries: "Tech journalist for All Things D, Former BusinessWeek writer" and "Former BusinessWeek writer, columnist".

Figure 3:
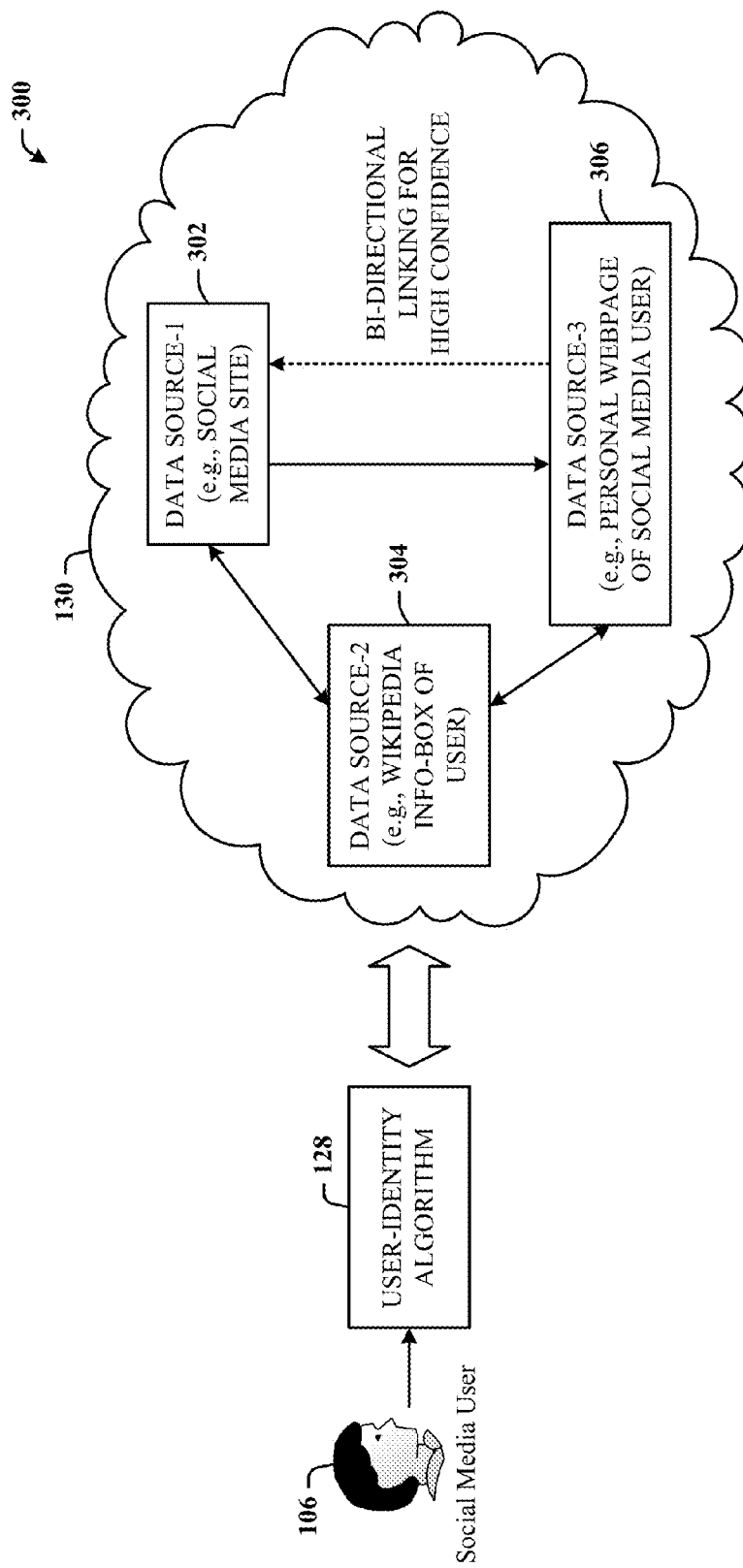
FIG. 3 illustrates a system of link-triangulation between three nodes of the data sources.

As previously indicated, not all users have such occupation patterns in a biography, and sometimes, the biography is missing. Therefore, the other-user generated information data type is employed, also referred to as link-triangulation and knowledge base exploitation. Continuing with the "expert" example, expert users typically have an informative knowledge base webpage (e.g., Wikipedia) because the expert user is topical celebrity, in a way, and people have written informative content about them. A challenge, however, is to first resolve the user identity between an expert user in Twitter and the potential knowledge base page. FIG. 3 illustrates a system 300 of link-triangulation between three nodes of the data sources 130. The other-user data can be exploited in two steps.

First, user identity resolution can be solved using link-triangulation, where the triangle is formed by three nodes, for example, a first data source 302 (e.g., the user's Twitter profile page), a second data source 304 (e.g., the user's potential knowledge base (Wikipedia) page/content), and a third data source 306 (e.g., the user's personal webpage). If a personal page link in the user's Twitter profile (Data Source-1) points to an external link (out-links to another webpage or document), which in turn, also an out-link in the knowledge base content, then it can be concluded that the knowledge base content belongs to the Twitter user 106.

Second, meaningful summary extraction is accomplished by accessing/extracting structured metadata content in the resolved knowledge base content. For the second data source 304 (Data Souce-2), if Wikipedia, the associated info-box, the informative summary box on the right side of a Wiki page, can be used, and the "occupation" property metadata, for example "Actor, comedian, director, screenwriter" processed. Additionally, content can be extracted from the first line of the Wiki page using the phrase after the word "is", whenever the info-box property "occupation" is unavailable.

Length based normalization can then be applied for the candidate summary as described above in step 6 of the occupation-pattern approach, by considering each occupation tag as the N-gram. Note that bi-directional linking is an option that can be performed between two data sources, such as between the social media site (the first data source 302 and the third data source 306) and the personal webpage for increased (high) confidence computation.

It can be the case that after using both the aforementioned two approaches there still remains some experts without summarization, principally due to unresolved user identity, missing structured metadata for the "occupation" property, missing biography or uninformative user biography, in the previous methods. Therefore, the fallback classification summary generation method can be employed. As previously indicated, the self-descriptive information is used here. In the application to Twitter, the user's messages (also called "tweets") can be processed. This approach uses messages written by an expert as well as messages in the interaction with this expert. In one implementation, users can be classified using three metrics: popularity of the user to acknowledge its fame, activity of the user in social media to consider a temporal aspect, and diffusion strength of user content to consider the ability to penetrate the user base of the social media communities.

These three metrics can be modeled in a time slice, as follows:

Popularity=maximum normalized logarithmic value of the number of Twitter mentions of the user (mentions in the social media network);

Activity=maximum normalized logarithmic value of the number of tweets written by the user (the number of message written by the user); and Diffusion Strength=maximum normalized logarithmic value of the number of "re-tweeted" tweets of the user (the number of messages of the user that are forwarded or passed to other users).

For a metric value V and maximum of metric values Max_V, the normalized value, Norm_V, can be computed as follows, $$\text{Norm\_}V = \text{LOG}(V+1)/\text{LOG}(\text{Max\_}V+1)$$

In a simple classifier, the 50-ith percentile can be considered on each of the metrics to classify a user on two levels for each metric—low and high. This results in eight classes in the 3-dimensional space.

Figure 4:
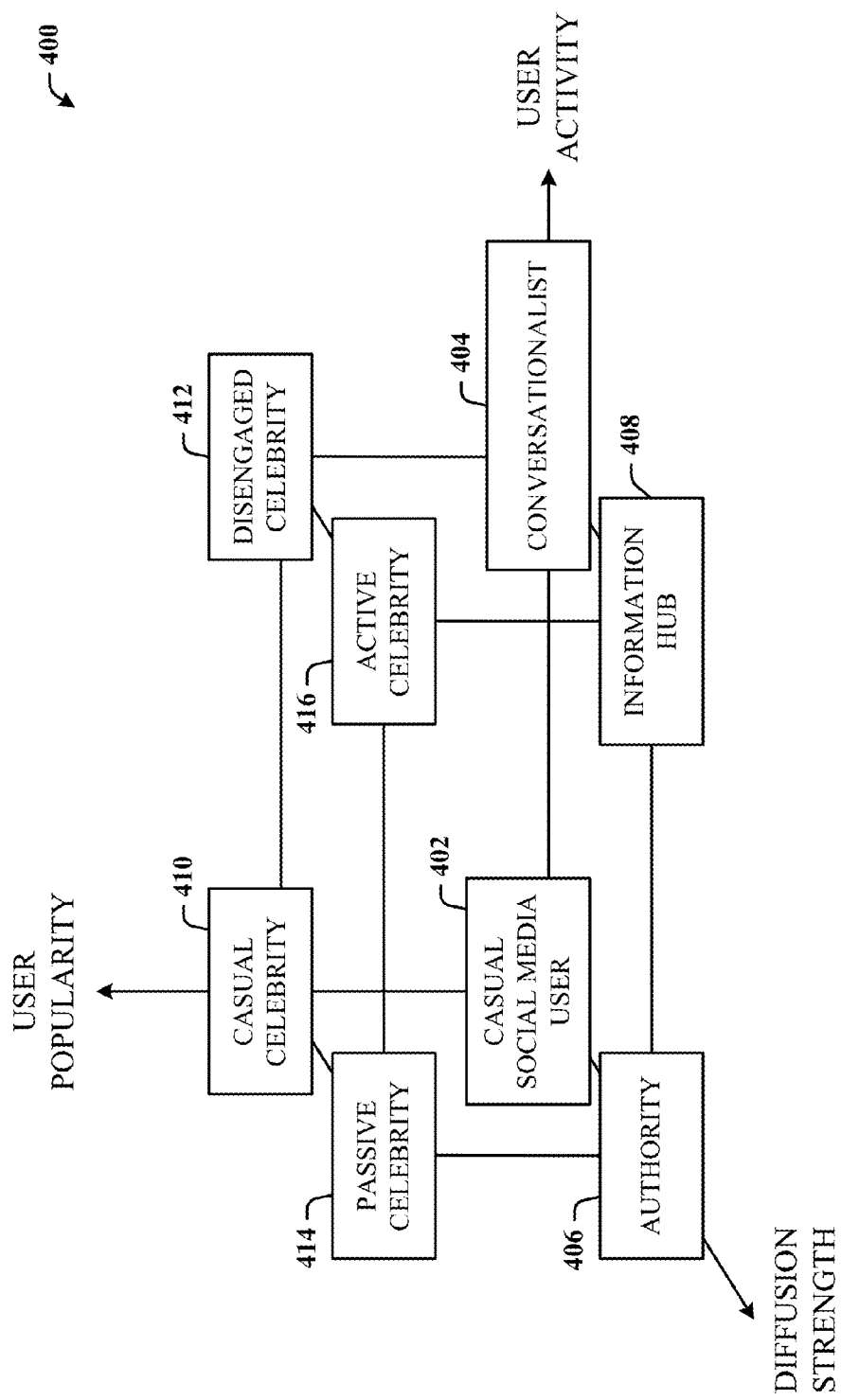
FIG. 4 illustrates a multi-dimensional graph for determining expertise classification of a user.

FIG. 4 illustrates a multi-dimensional graph 400 for determining expertise classification of a social media user. FIG. 5 illustrates a table 500 of expertise summaries for each class. The classes include, but are not limited to, casual user 402, conversationalist 404, authority 406, information hub 408, casual celebrity 410, disengaged celebrity 412, passive celebrity 414, and active celebrity 416. The graph 400 is three-dimensional with the axes extending outward from an origin (the tri-axis point of intersection, typically (0,0,0)). The x-axis (horizontal) represents user activity, the y-axis (vertical) represents user popularity, and the z-axis (perpendicular to both the x-axis and y-axis) represents diffusion strength.

The graph 400 shows, for example, that the passive celebrity 414 is defined by a maximum value of diffusion strength and user popularity, but a minimum value of user activity. The casual user 402 is represented at the origin with the minimum values of diffusion strength, popularity and activity. The authority 406 has a maximum value for diffusion strength and minimum values for popularity and activity. Other classes can be similarly described, such as the casual celebrity 401 that has a maximum value for use popularity and minimum values for diffusion strength and user activity.

In a more specific description, user X is the casual user 402, if X seldom comes to the social media site to write messages, in which case X resembles a lurker or listener. User X is the conversationalist 404 on the social media site, if X messages too much on the site, but does not receive a number of responses or attention from others. User X is the authority 406 (also called the authoritative writer), if X's messages are resent/forwarded frequently, but seldom messages (possibly writes good content). User X is the information hub 408 on the social media site, if X's messages are resent/propagated frequently and actively participates by sending more messages.

User X is the casual celebrity 410, if X is popular and often associated with some topics (by mentions), but rarely messages. User X is the disengaged celebrity 412, if X is popular (mentioned a lot) and also messages but does not get resent/forwarded frequently. User X is the passive celebrity 414, if X is popular (mentioned frequently) and resent/forwarded frequently, but rarely sends messages. User X is the active celebrity 416, if X is popular and gets resent/forwarded frequently, as well as writes messages actively. These are all outlined in FIG. 5. Note that this straightforward computation model of classifying users can be further advanced with a more sophisticated metric computation.

As described previously, choosing the final expertise summary from a set of candidate expertise summaries for a user can be based on three principles: readability (how well the candidate can be read), specificity (what unique aspect is present in the candidate), and interestingness (how interesting is the candidate). The following methods address a computing model for each of these principles.

Readability by linguistic test: the Flesch Reading Ease Scoring can be applied on each of the candidate summaries, where the test assigns a score [0-100] to a candidate summary—the higher the score, the better the candidate. This test computes the score based on syllable presence, complexity of words in the candidate, etc.

Specificity and Interestingness by modified tf-idf approach: it is noted that the more specific information a summary contains, the more likely the summary is to be informative; and therefore, the summary is likely to generate more interest in the reader of the expertise presentation.

A goal is to find the most beneficial document (expertise summary) by its own significance in the vector space of terms extracted from all the documents (summaries) of all the users, as described below. The summary scores are normalized by a maximum character limit imposed by UI design, in order to boost scores for candidates with an ideal length of utilizing available space when there is a comparison between the two candidates with marginal difference in scores. The final summary for a user is selected based on the highest score of the summary among candidates.

The computation steps for computing the final summary are now described. Consider each candidate user summary as a document, D, and a unique term t in that document.

With respect to computing the term score, for each term t in the document D with the total words as all_words_in_D, compute the significance of term t, locally and globally:

Locally, tf=term frequency in the form of frequency of t, say freq_t_in_D

Globally, idf=inverse document frequency in the form of the log ratio of total number of documents M, and total number of documents containing term t, designated all_D_containing_t:

$$tf\text{-}idf(t,D)=tf*idf=(freq\_t\_in\_D)*\log(M/all\_D\_containing\_t)$$

With respect to computing the document (expertise summary) score, the significance scores for each t; tf-idf(t,D) are aggregated and normalization is performed by document word length, all_words_in_D. An aggregate function can be, for example, a SUM function:

$$Score(D)=(AGGREGATE(tf\text{-}idf(t,D))/all\_words\_in\_D)$$

With respect to normalized summary score by space constraint, normalize the score of document D by the ratio of length of characters in D, say total_characters_in_D and maximum character limit imposed by threshold T from UI design to boost scores for the summary with length near to threshold T (note that generated summaries have length <=T):

$$Score'(D)=(Score(D)*total\_characters\_in\_D)/T$$

The score of the document D can be further normalized by the ratio of length of characters in document D, total_characters_in_D, and the maximum character limit imposed by threshold T from user interface design, MAX_CHAR_LIMIT, to boost expertise summaries with the desired length:

$$Score(D)=(Score(D))/MAX\_CHAR\_LIMIT)$$

Figure 6:
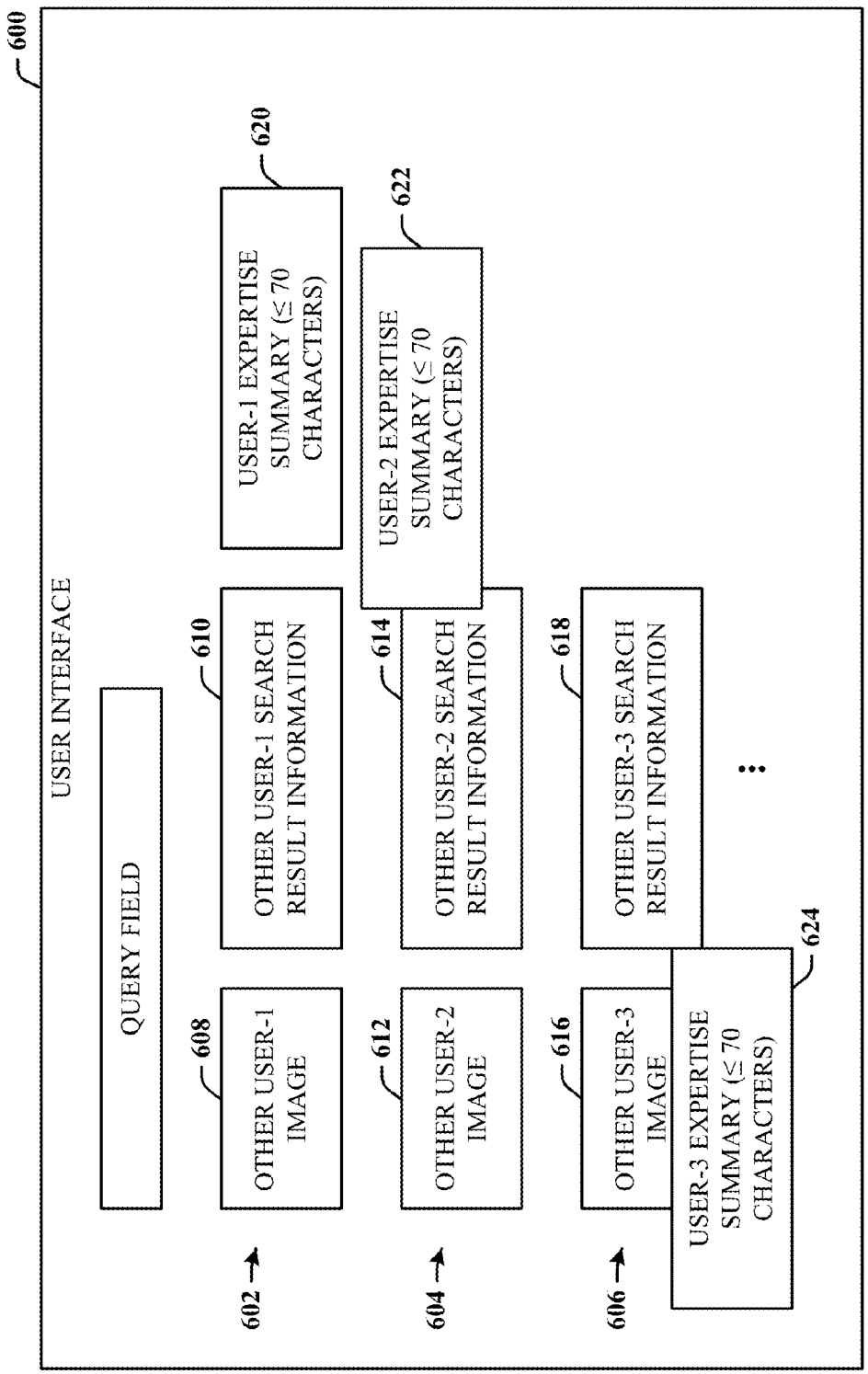
FIG. 6 illustrates an exemplary user interface that shows expert summaries for several users.

FIG. 6 illustrates an exemplary user interface 600 that shows expert summaries for several users. The user interface 600 can be a search engine results page (SERP) or other similar type of user interface, such as a social network UI, for example, that presents information associated with and returned from (directly or indirectly) other users who may have commented, written, messaged, etc., about a topic of interest that is searched. Here, three results are shown: a first result 602 related to a first user (User-1), a second result 604 related to a second user (User-2), and a third result 606 related to a third user (User-3).

The first result 602 includes an image 608 of the first user, and search result information 610 related to the first user and the query, which can comprise an alias, user name, contact domain, website link, snippet of topical information related to the query such as quotes, etc. Similarly, the second result 604 includes an image 612 of the second user, and search result information 614 related to the second user and the query, which can comprise an alias, user name, contact domain, website link, snippet of topical information related to the query such as quotes, etc. The third result 602 includes an image 616 of the third user, and search result information 618 related to the third user and the query, which can comprise an alias, user name, contact domain, website link, snippet of topical information related to the query such as quotes, etc.

The user interface design can be in different ways for presenting the expertise summaries for each user. For example, a first expertise summary 620 for the first user can be presented as a sidebar to the right of the first result 602. A second expertise summary 622 for the second user can be presented as a pop-up towards the right side of the user interface where the pop-up location is intuitively perceived by the viewer to be associated with the second user and second result 604. The pop-up can be activated simply by the user hovering the mouse pointer anywhere on the second result 604, and then require manual interaction to close it. A third expertise summary 624 for the third user can be presented as a pop-up proximate the image 616 of the third user. Again, the pop-up can be activated simply by the viewing user hovering a pointer anywhere on the third result 606, but disappears automatically when the user moves the pointer anywhere off the third result 606.

The disclosed architecture also finds application to environments outside the social network to document editing where the editors may not be that well-known to the other editors, such as in publically editable knowledge bases (e.g., Wikipedia). Not only can a single document be generated by a single author for inclusion into the public knowledge base about a given topic, but other users can then provide subsequent edits to the same document, for clarification, more detailed information, and the like. Thus, a given edit can be related to the author that made the edit. Additionally, when a viewer interacts with the edit in some way, the expertise summary can be automatically presented as a flyover box, or pop-up, for example, that indicates to the viewer the class of expertise of the author for that specific edit. This capability provides more or less credibility to the edit, the document itself, and the knowledge base as a whole, from the perspective of the viewer.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
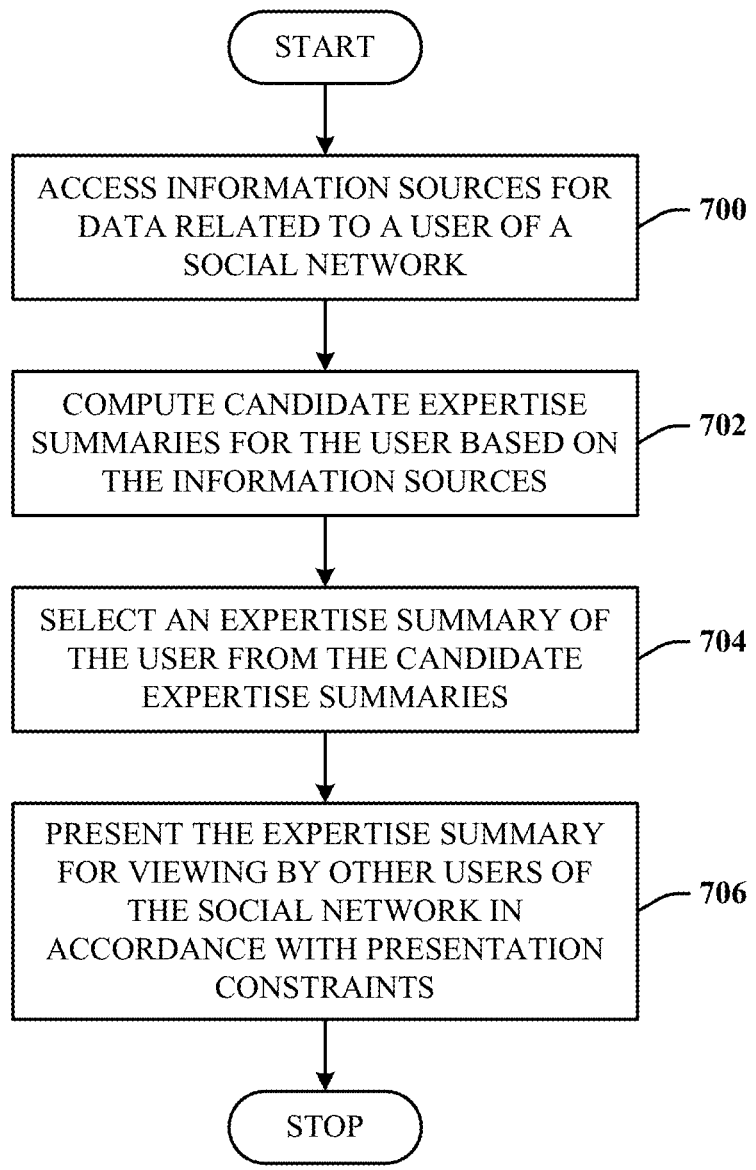
FIG. 7 illustrates a method in accordance with the disclosed architecture.

FIG. 7 illustrates a method in accordance with the disclosed architecture. At 700, information sources are accessed for data related to a user of a social network. The information sources include badges, structured knowledge bases, occupational data sources, employee data sources (where allowed), user profile data, and so on. At 702, candidate expertise summaries are computed for the user based on the information sources. At 704, an expertise summary of the user is selected from the candidate expertise summaries. At 706, the expertise summary is presented for viewing by other users of the social network in accordance with presentation constraints. A microprocessor can be configured to execute instructions in a memory associated with at least one of the acts of accessing, computing, selecting, or presenting.

The method can further comprise computing the candidate expertise summaries for the user based on occupation of the user as obtained from an occupation knowledge base as one of the information sources. The method can further comprise computing the candidate expertise summaries for the user based on link-triangulation of different pages of information to resolve identity of the user.

The method can further comprise selecting the expertise summary from the candidate expertise summaries based on quality assessment criteria that includes readability, interest, and specificity. The method can further comprise accessing information sources that include self-generated information and other-user generated information, both of which relate to the user.

The method can further comprise computing classification of the user as to expertise, the classification based on user communications, and processing the user communications based on popularity of the user, activity of the user in the social network, and re-communications (e.g., forwarding) by other users of the user communications.

Figure 8:
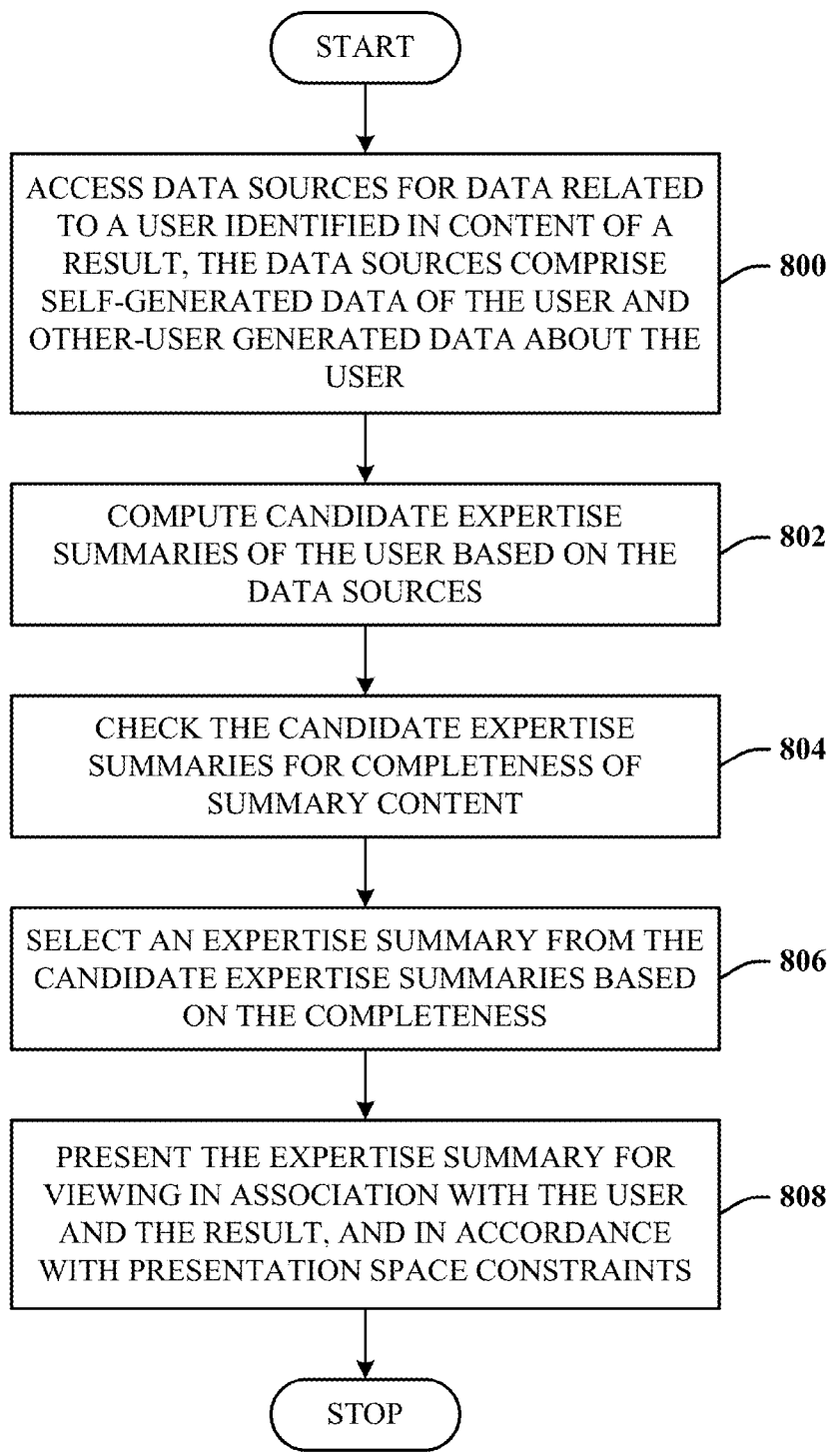
FIG. 8 illustrates an alternative method in accordance with the disclosed architecture.

FIG. 8 illustrates an alternative method in accordance with the disclosed architecture. At 800, data sources are accessed for data related to a user identified in content of a result. The data sources comprise self-generated data of the user and other-user generated data about the user. At 802, candidate expertise summaries of the user are computed based on the data sources. At 804, the candidate expertise summaries are checked for completeness of summary content. At 806, an expertise summary is selected from the candidate expertise summaries based on the completeness. At 808, the expertise summary is presented for viewing in association with the user and the result, and in accordance with presentation space constraints. A microprocessor configured to execute instructions in a memory associated with at least one of the acts of accessing, computing, checking, selecting, or presenting.

The method can further comprise selecting the expertise summary based on criteria applied to the candidate expertise summaries. The criteria include readability, specificity, and interestingness. The method can further comprise resolving identity of the user based on cross-node checks of disparate data sources. The method can further comprise generating the candidate expertise summaries based on crowd-sourced lists of users that include the user, the list used to extract common topics and user categories. The method can further comprise processing the candidate expertise summaries to exceed no more than a predetermined number of characters.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
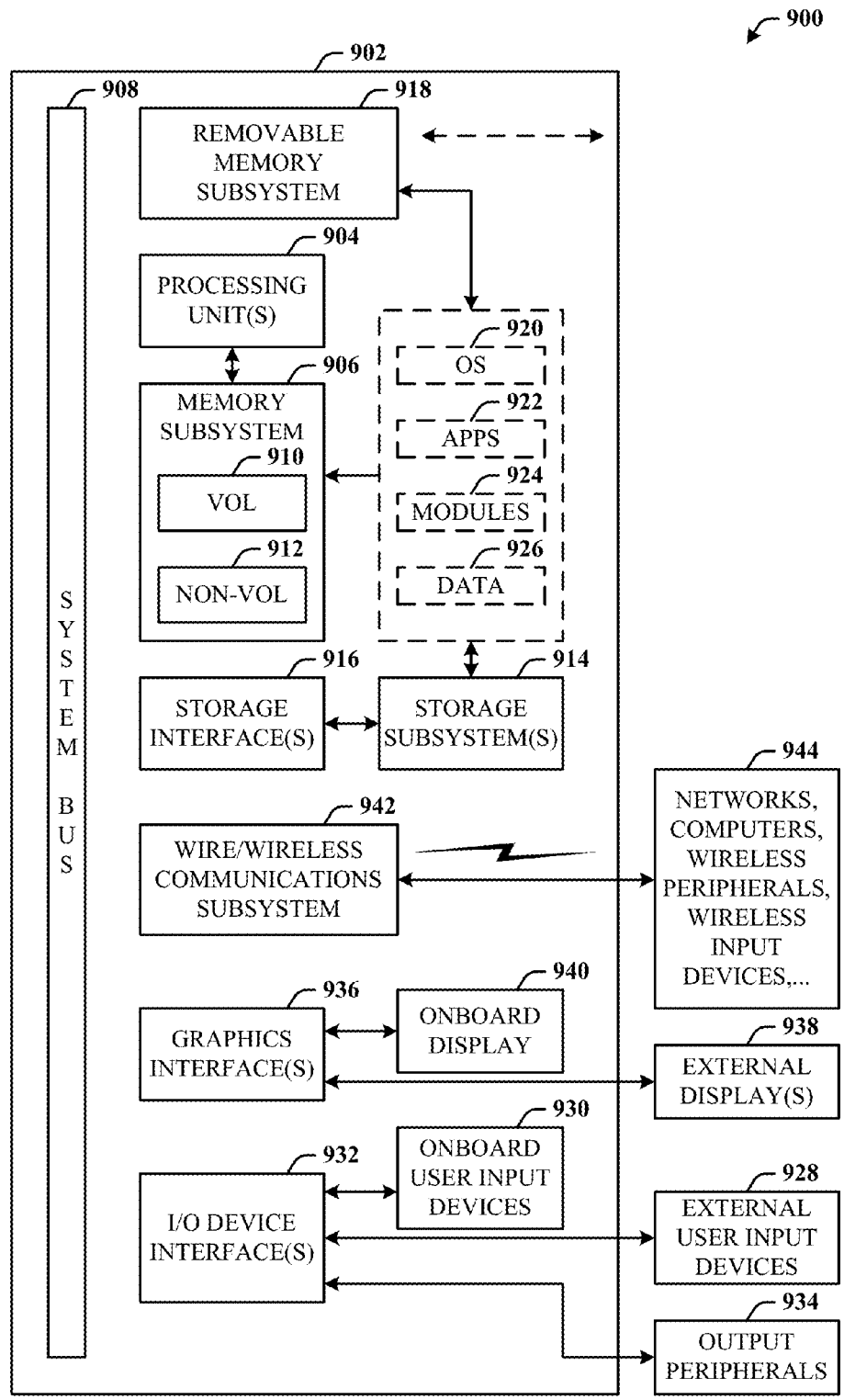
FIG. 9 illustrates illustrated a block diagram of a computing system that executes automated user expertise summaries in accordance with the disclosed architecture.

Referring now to FIG. 9, there is illustrated a block diagram of a computing system 900 that executes automated user expertise summaries in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904 (also referred to as microprocessor(s) and processor(s)), a computer-readable storage medium such as a system memory 906 (computer readable storage medium/media also include magnetic disks, optical disks, solid state drives, external memory systems, and flash memory drives), and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 902 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 906 can include computer-readable storage (physical storage) medium such as a volatile (VOL) memory 910 (e.g., random access memory (RAM)) and a non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and/or program data 926 can include entities and components of the system 100 of FIG. 1, entities and components of the system 200 of FIG. 2, entities and flow of the diagram 300 of FIG. 3, the graph 400 of FIG. 4, the table 500 of FIG. 5, the user interface 600 of FIG. 6, and the methods represented by the flowcharts of FIGS. 7 and 8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) can be any available media (medium) that do (does) not employ propagated signals, can be accessed by the computer 902, and includes volatile and non-volatile internal and/or external media that is removable and/or non-removable. For the computer 902, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 902, programs, and data using external user input devices 928 such as a keyboard and a mouse, as well as by voice commands facilitated by speech recognition. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example.

These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising computer-executable instructions that when executed by a hardware processor cause the hardware processor to perform acts of:
   accessing information sources for data related to a user of a social network;
   determining that profile information is missing for classification of the user on the social network;
   computing, based on the determining that the profile information is missing, candidate expertise summaries for the user based on the information sources and an inferred classification of the user generated from an evaluation of: popularity of the user including communications posted by the user, re-communications by other users of the communications posted by the user and mentions of the user by the other users in the social network;
   selecting an expertise summary of the user from the candidate expertise summaries; and
   presenting the expertise summary for viewing by other users of the social network.

2. The method of claim 1, further comprising computing the candidate expertise summaries for the user based on occupation of the user as obtained from a knowledge base as one of the information sources.

3. The method of claim 1, further comprising computing the candidate expertise summaries for the user based on a plurality of different pages of information of the user to resolve identity of the user.

4. The method of claim 1, further comprising selecting the expertise summary from the candidate expertise summaries based on quality assessment criteria.

5. The method of claim 1, further comprising accessing information sources that include self-generated information and other-user generated information, both of which relate to the user.

6. The method of claim 1, further comprising determining the inferred classification of the user from a classification scoring that is computed based on the evaluation.

7. The method of claim 1, wherein the selecting selects the expertise summary from the candidate expertise summaries based on an identification of a relationship between a received query and content of the expertise summary.

8. A computer-readable medium that comprises computer-executable instructions that when executed by a hardware processor cause the hardware processor to perform a method comprising:
   accessing data sources for data related to a user identified in content of a result, the data sources comprise self-generated data of the user and other-user generated data about the user;
   determining that profile information is missing for classification of the user on the social network;
   computing, based on the determining that the profile information is missing, candidate expertise summaries for the user based on the information sources and an inferred classification of the user generated from an evaluation of: popularity of the user including communications posted by the user, re-communications by other users of the communications posted by the user and mentions of the user by the other users in the social network;
   selecting an expertise summary from the candidate expertise summaries; and
   presenting the expertise summary for viewing in association with a user account of the user.

9. The computer-readable medium of claim 8, wherein the method, executed by the hardware processor, further comprising selecting the expertise summary based on criteria applied to the candidate expertise summaries.

10. The computer-readable medium of claim 8, wherein the method, executed by the hardware processor, further comprising resolving identity of the user based on out-links to a personal webpage of the user.

11. The computer-readable medium claim 8, wherein the method, executed by the hardware processor, further comprising generating the candidate expertise summaries based on crowd-sourced lists of users that include the user, the list used to extract common topics and user categories.

12. The computer-readable medium of claim 8, wherein the method, executed by the hardware processor further comprising processing the candidate expertise summaries to exceed no more than a predetermined number of characters.

13. A system comprising:
   a memory storing computer-executable instructions; and
   at least one processor, connected with the memory, that executes the computer-readable instructions to perform a method that comprises:
      accessing information sources for data related to a user of a social network;
      determining that profile information is missing for classification of the user on the social network;
      computing, based on the determining that the profile information is missing, candidate expertise summaries for the user based on the information sources and an inferred classification of the user generated from an evaluation of: popularity of the user including communications posted by the user, re-communications by other users of the communications posted by the user and mentions of the user by the other users in the social network;

selecting an expertise summary of the user from the candidate expertise summaries; and presenting the expertise summary for viewing by other users of the social network.

14. The system of claim 13, wherein the method, executed by the at least one processor, further comprises computing the candidate expertise summaries for the user based on occupation of the user as obtained from a knowledge base as one of the information sources.

15. The system of claim 13, wherein the method, executed by the at least one processor, further comprises computing the candidate expertise summaries for the user based on a plurality of different pages of information of the user to resolve identity of the user.

16. The system of claim 13, wherein the method, executed by the at least one processor, further comprises selecting the expertise summary from the candidate expertise summaries based on quality assessment criteria.

17. The system of claim 13, wherein the method, executed by the at least one processor, further comprises accessing information sources that include self-generated information and other-user generated information, both of which relate to the user.

18. The system of claim 13, wherein the method, executed by the at least one processor, further comprises determining the inferred classification of the user from a classification scoring that is computed based on the evaluation.

19. The system of claim 13, wherein the selecting selects the expertise summary from the candidate expertise summaries based on an identification of a relationship between a received query and content of the expertise summary.

20. The system of claim 13, wherein the presenting of the expertise summary presents the expertise summary for viewing in association with a user account of the user.

* * * * *